United States Patent [19]
Zeidler et al.

[11] Patent Number: 5,257,834
[45] Date of Patent: Nov. 2, 1993

[54] PIPE COUPLING

[75] Inventors: Siegmung Zeidler, Hanau; Manfred Krüger, Büdingen, both of Fed. Rep. of Germany

[73] Assignee: Rasmussen GmbH, Maintal, Fed. Rep. of Germany

[21] Appl. No.: 745,612

[22] Filed: Aug. 15, 1991

[30] Foreign Application Priority Data

Sep. 7, 1990 [DE] Fed. Rep. of Germany ....... 4028449

[51] Int. Cl.$^5$ .............................................. F16L 25/06
[52] U.S. Cl. .................... 285/328; 285/367; 285/910
[58] Field of Search ............... 285/364, 365, 366, 367, 285/910, 406, 407, 408, 409, 410, 411, 332.2, 332.3, 328

[56] References Cited

U.S. PATENT DOCUMENTS

| | | | |
|---|---|---|---|
| 2,449,795 | 9/1948 | Stillwagon | 285/367 X |
| 2,834,087 | 5/1958 | Herman | 285/367 X |
| 3,235,293 | 2/1966 | Condon | 285/367 X |
| 3,346,275 | 10/1967 | Des Jardins | 285/93 |
| 3,398,978 | 8/1968 | Gasche | 285/367 X |
| 3,498,649 | 3/1970 | Pfeuffer | 285/365 |
| 4,527,818 | 7/1985 | Rundell | 285/367 X |
| 4,832,380 | 5/1989 | Oetiker | 285/365 X |
| 5,015,018 | 5/1991 | Arnoldt | 285/367 |

FOREIGN PATENT DOCUMENTS

| | | | |
|---|---|---|---|
| 1738844 | 1/1957 | Fed. Rep. of Germany . | |
| 1245656 | 7/1967 | Fed. Rep. of Germany | 285/365 |
| 1580750 | 9/1969 | France | 285/365 |
| 105496 | 4/1974 | German Democratic Rep. . | |
| 554738 | 1/1957 | Italy | 285/365 |
| 309656 | 4/1929 | United Kingdom | 285/367 |

*Primary Examiner*—Dave W. Arola
*Attorney, Agent, or Firm*—Peter K. Kontler

[57] ABSTRACT

A coupling for pipes having confronting ends with conical or flat outwardly extending flanges utilizes an elastomeric sealing ring which is placed between the flanges and a variable-diameter clamping device which is positioned to surround the flanges and has two radially inwardly divergent sidewalls each of which is adjacent the exposed side of one of the flanges. The conical radially inner portions of the sidewalls engage and penetrate into the external surfaces of the pipes in response to a reduction of the diameter of the clamping device, and any further reduction of the diameter entails a movement of progressively larger parts of radially outer portions of the sidewalls into engagement with the exposed sides of the adjacent flanges to bring about radial compression of a large portion of the sealing ring.

21 Claims, 1 Drawing Sheet

PIPE COUPLING

BACKGROUND OF THE INVENTION

The invention relates to pipe couplings in general, and more particularly to improvements in pipe couplings of the type wherein a sealing ring between the outwardly extending flanges at the confronting ends of the pipes to be sealingly coupled to each other can be deformed by an annular clamping device which can be positioned to surround the flanges and to have its diameter reduced to thereby bias the flanges against the respective sides of the sealing ring.

U.S. Pat. No. 3,498,649 to Pfeuffer discloses a pipe clamping and centering device wherein the pipes which are to be sealingly coupled to each other end-to-end are provided with conical flanges. The clamping device comprises two conical sidewalls each of which is outwardly adjacent one of the conical flanges, and the flanges are separated from each other by an annular sealing ring having a trapezoidal or circular cross-sectional outline. The conicity of the radially outer portions of sidewalls of the clamping device is the same as that of the respective flanges, and the radially inner portions of the sidewalls are short cylinders which spacedly surround the external surfaces of the respective pipes. As a rule, pipes having conical flanges are made of relatively thin and hence readily deformable material (normally metallic sheet material). Therefore, once the pressure in the pipeline has risen to a relatively low level, the pipes tend to move axially and away from each other with resulting deformation of their flanges to thus establish clearances between the inner sides of the deformed flanges and the adjacent sides of the sealing ring. At the same time, the radially outermost portion of the ring is subjected to pronounced (often excessive) compressive stresses. Such situation is particularly likely to develop if the diameter of the clamping device is not or cannot be reduced to an extent which is necessary to ensure that the cylincrical radially inner portions of its sidewalls actually contact the external surfaces of the respective pipes. This establishes larger lever arms for the axial component of the force which is generated by the confined fluid medium and tends to move the pipes axially and away from each other, and the confined fluid tends to deform the flanges in a sense to separate their internal surfaces from the adjacent sides of the sealing ring. The clearances between the deformed flanges and the sealing ring result in leakage of the confined fluid medium.

A modified pipe coupling for two pipes one of which has a substantially conical flange and the other of which has a substantially radial flange is disclosed in U.S. Pat. No. 3,346,275 to Des Jardins. The cross-sectional outline of the clamping device is analogous to that of the clamping device in the pipe coupling of Pfeuffer, i.e., the clamping device has two sidewalls with conical radially outer portions and cylindrical radially inner portions which are remote from the external surfaces of the pipes. In addition, the pipe joint of Des Jardins must employ a specially designed insert which is to be placed next to the radially extending flange in order to be engaged by the conical radially outer portion of the respective sidewall of the clamping device.

The danger of undesirable deformation of flanges is even more pronounced if the flanges extend radially of the respective pipes, especially if the sidewalls of the clamping device are hollow conical frusta all the way from the radially inner to the radially outer ends. In such pipe couplings, the sidewalls of the clamping device engage only the external surfaces of the radially outer portions of the radially extending flanges to thus permit substantial deformation of the flanges all the way between their radially innermost and outermost ends. This entails the development of pronounced clearances between the inner sides of the deformed flanges and the adjacent sides of the sealing ring so that the confined fluid medium is even more likely to escape at the coupling.

German Utility Model No. 1 738 844 of Abel & Ebel KG discloses a sealing washer which is provided with a circumferentially extending harder portion. The washer is to be used in large-diameter pipes as a substitute for washers wherein a metallic ring is embedded in elastomeric material.

East German Pat. No. 105 496 of Karras et al. discloses a sealing ring which is to be used between a pipe and the flange of a boiler and has a radially inner portion in the form of an axially extending sealing lip.

Various conventional pipe couplings are shown in a publication which is distributed by the assignee of the present application and is entitled "Vorblatt zur Baureihe 4". Some of the pipe couplings which are shown in this publication are similar to those disclosed by Pfeuffer and Des Jardins.

OBJECTS OF THE INVENTION

An object of the invention is to provide a pipe coupling which is more reliable than, and is at least as simple as, heretofore known pipe couplings.

Another object of the invention is to provide a pipe coupling which can stand oronounced pressures of confined liquids without the danger of deformation of flanges of the pipes and/or of deformation of the clamping device.

A further object of the invention is to provide a novel and improved sealing ring for use in the above outlined pipe coupling.

An additional object of the invention is to provide a novel and improved clamping device for use in the above outlined pipe coupling.

Still another object of the invention is to provide a pipe coupling which consists of a small number of simple parts.

A further object of the invention is to provide a pipe coupling wherein all parts of the clamping device contribute to a reliable and long-lasting sealing action.

SUMMARY OF THE INVENTION

The invention is embodied in a coupling for pipes of the type having external surfaces and confronting ends provided with outwardly extending flanges. The improved coupling comprises a deformable elastomeric sealing ring which is insertable between the flanges, and a variable-diameter annular clamping device which is positionable to surround the flanges and includes two axially spaced-apart sidewalls each of which is outwardly adjacent one of the flanges when the clamping device surrounds the flanges. The sidewalls diverge from one another toward the external surfaces of the pipes and each such sidewall includes a radially outer portion and a conical radially inner portion. The radially outer portions of the sidewalls urge the flanges against the deformable sealing ring, and the radially inner portions of the sidewalls bear against the external surfaces of the respective pipes in response to a reduction of the diameter of the clamping device while the latter surrounds the flanges.

The radially inner portions of the sidewalls can be provided with toothed edges which extend circumferentially around and penetrate into the external surfaces of the respective pipes in response to a reduction of the diameter of the clamping device.

The conical internal surfaces of the radially inner portions of the sidewalls can have apex angles of 10 to 30°, preferably at least close to 15°.

The flanges of the pipes can extend at least substantially radially outwardly of the axes of the respective pipes. The radially outer portions of the two sidewalls then preferably include radially outer sections with conical internal surfaces having base angles of 1 to 4° (preferably at least close to 2°), second sections radially inwardly adjacent the respective radially outer sections and having conical internal surfaces with base angles greater than the base angles of internal surfaces of the radially outer sections, and radially inner sections disposed between the respective second sections and the respective radially inner portions. The outer sides of the substantially radially extending flanges include concave radially inner parts having first radii of curvature and merging into the external surfaces of the respective pipes, and the radially inner sections of the radially outer parts of the sidewalls are preferably provided with convex internal surfaces having radii of curvature greater than the first radii of curvature.

The sealing ring preferably includes a radially extending portion between the flanges and two annular lips each of which extends into one of the pipes radially inwardly of the respective flange. The lips are preferably provided with concave external surfaces which are adjacent convex internal surfaces of radially inner portions of the respective flanges. The radii of curvature of the concave external surfaces can at least approximate or are slightly greater than the radii of curvature of the convex internal surfaces of radially inner portions of the respective flanges.

The radially outermost part of the radially extending portion of the sealing ring is preferably engaged by an at least substantially rigid circumferentially complete annulus. The radially outermost part of the radial portion of the sealing ring can be provided with a groove which is formed in the peripheral surface of the radial portion of the ring and receives the annulus. The groove is preferably undercut so that it can at least substantially or completely confine the annulus when the flanges of the pipes are urged against and deform the sealing ring in response to a reduction of the diameter of the clamping device. The annulus can be made of metallic wire.

The internal surface of the sealing ring can be provided with a preferably shallow annular recess which is flanked by the aforementioned annular lips.

The novel features which are considered as characteristic of the invention are set forth in particular in the appended claims. The improved pipe coupling itself, however, both as to its construction and the mode of assembling and operating the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
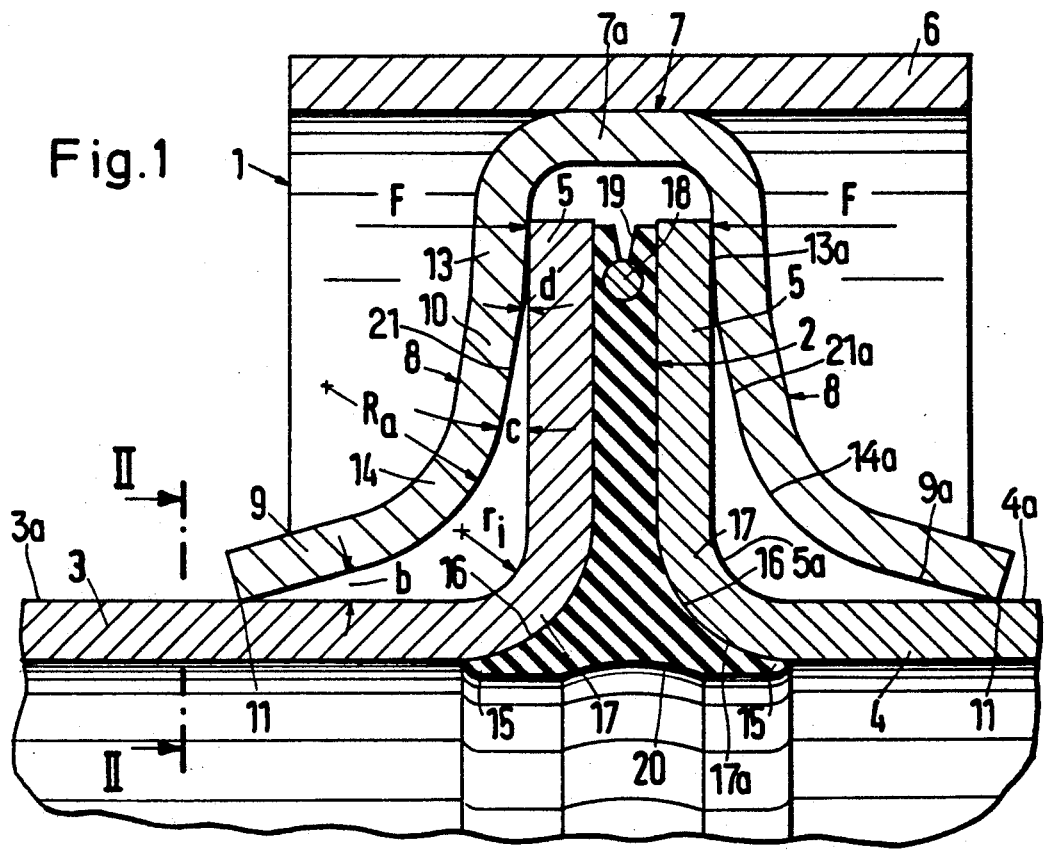
FIG. 1 is a fragmentary axial sectional view of two coaxial pipes and of a pipe coupling which embodies one form of the invention, the parts of the coupling being shown in positions they assume prior to axial stressing of the sealing ring between the radially extending flanges of the pipes.

The illustrated pipe coupling 1 includes a metallic clamping device 7 of variable diameter and a deformable elastomeric sealing ring 2. The purpose of the coupling 1 is to establish a separable leakproof connection between the confronting ends of two coaxial pipes 3 and 4. The confronting ends of these pipes have radially outwardly extending flanges 5 which are disposed in parallel planes extending at right angles to the common axis of the pipes. The diameter of the clamping device 7 can be varied by a split cylinder 6 which is spot welded or otherwise connected to the radially outermost portion or web 7a of the clamping device 7 and the diameter of which can be varied in a manner as shown, for example, in FIG. 3 of U.S. Pat. No. 3,346,275 to Des Jardins. The clamping device 7 can be made of a single piece of metallic material or can be assembled of two or more arcuate sections which are welded to the internal surface of the split cylinder 6.

Figure 3:
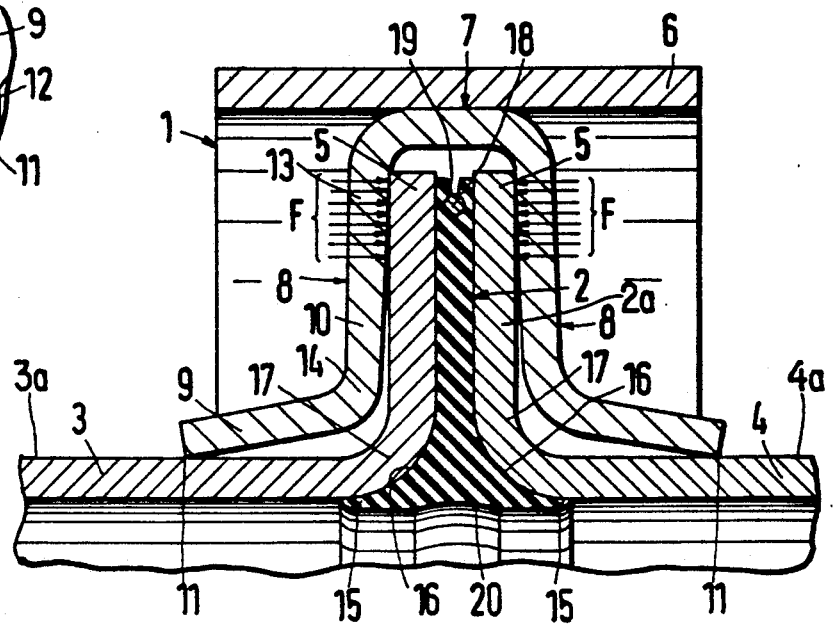
FIG. 3 is a smaller-scale view of the structure of FIG. 1 but with the sealing ring in deformed condition.

The illustrated clamping device 7 comprises two sidewalls 8 which are mirror images of each other with reference to a plane that is parallel to and extends midway between the flanges 5 when the clamping device is positioned in a manner as shown in FIGS. 1 and 3, i.e., in such a way that it surrounds the flanges 5. The radially outermost parts of the sidewalls 8 are integral with the relatively short cylindrical web 7a which is welded to the internal surface of the split cylinder 6.

The sidewalls 8 diverge in a direction from the web 7a toward the external surfaces 3a, 4a of the respective pipes 3 and 4. Each sidewall 8 comprises a radially outer portion 10 and a conical radially inner portion 9. Each radially outer portion 10 comprises a radially outer section 13 which is a very low or short conical frustum and has an internal surface 13a making with the external surface of the adjacent flange 5 a relatively small base angle $d$, preferably in the range of 1 to 4°, most preferably at least approximately 2°. The radially outer sections 13 of the radially outer portions 10 serve to engage the external surfaces or outer sides of the respective flanges 5 and to urge such flanges toward each other (i e., toward sealing engagement with the radially extending portion 2a of the sealing ring 2) in response to a reduction of the diameter of the clamping device 7 (see FIG. 3).

The radially outer portion 10 of each sidewall 8 further comprises a second section 21 which is radially inwardly adjacent the respective outer section 13 and has a conical internal surface 21a which makes with the external surface of the respective flange 5 a base angle $c$ which is greater than the base angle $d$. Still further, the radially outer portion 10 of each sidewall 8 includes a radially inner section 14 which is located between the respective second section 21 and the respective radially inner portion 9 and has a convex internal surface 14a with a relatively large radius of curvature $R_a$.

The radially inner parts or portions 17 of the flanges 5 have concave external surfaces 5a with relatively small radii of curvature $r_i$. Each external surface 5a is adjacent but spaced apart from the respective convex internal surface 14a.

The radially inner portion 9 of each sidewall 8 is a hollow conical frustum having an internal surface 9a with an apex angle b in the range of 10 to 30°, preferably at least close to 15°. The apex angles b are defined by the conical internal surfaces 9a and the respective external surfaces 3a, 4a.

Figure 2:
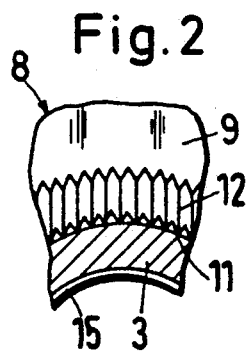
FIG. 2 is a fragmentary transverse sectional view substantially as seen in the direction of arrows from the line II—II of FIG. 1.

When the diameter of the clamping device 7 is reduced in response to a reduction of the diameter of the split cylinder 6, the toothed or serrated edges 11 of the radially inner portions 9a abut and preferably penetrate into the respective external surfaces 3a, 4a. The teeth or serrations of the conical radially inner portions 9 at their edges 11 can be seen in FIG. 2, as at 12. The teeth 12 are optional; they are preferably provided in order to enhance the ability of the edges 11 to penetrate into the material of the respective pipes. Such penetration of edges 11 into the material of the pipes reduces the likelihood of axial shifting of the radially inner portions 9 of the sidewalls 8 when the pipe coupling 1 is in use, i.e., when the pipes 3, 4 are called upon to convey a gaseous or hydraulic fluid from the pipe 3 into the pipe 4 or in the opposite direction.

The internal surfaces 9a and the adjacent external surfaces 3a, 4a make apex angles b of between 10 and 30° when the clamping device 7 is idle, i.e., when the sections 21 and/or 13 of the sidewalls 8 do not bear against the adjacent portions of the external surfaces of the flanges 5. The same holds true for the base angles c and d, i.e., the sections 13, 21 of the sidewalls 8 and the adjacent portions of the respective flanges 5 define such base angles when the diameter of the clamping device 7 is sufficiently large to permit axial expansion of the radially extending washer-like portion 2a of the elastomeric sealing ring 2. Each base angle c can be in the range of 5 to 20°, preferably 7°–8°.

The illustrated sealing ring 2 has two annular axially extending lips 15 which flank a centrally located shallow annular recess 20 in the internal surface of the sealing ring and each of which extends into one of the pipes 3 and 4 when the coupling 1 is properly assembled. The lips 15 have concave external surfaces 16 which are adjacent convex internal surfaces 17a of the radially inner portions 17 of the respective flanges 5. The radii of curvature of the concave external surfaces 16 of the lips 5 can approximate or exceed the radii of curvature of the convex internal surfaces 17a of the respective radially inner portions 17.

The peripheral surface of the radially outermost part of the washer-like radially extending portion 2a of the sealing ring 2 is provided with an undercut groove 19 for a circumferentially complete annulus 18, e.g., a ring consisting of commercially available metallic wire. As shown in FIG. 3, the annulus 18 can be completely or practically completely surrounded by the material of the sealing ring 2 when the washer-like portion 2a is deformed by the flanges 5 in response to a reduction of the diameter of the clamping device 7. The ends of the wire which forms the annulus 18 are preferably welded to each other. The configuration of the groove 19 in the peripheral surface of the washer-like portion 2a can be such that the annulus 18 is fully or nearly fully concealed even when the sealing ring 2 is still in unstressed condition.

The purpose of the relatively shallow recess 20 in the internal surface of the sealing ring 2 is to enhance the flexibility of the lips 15.

The coupling 1 is assembled as follows:

One lip 15 of the sealing ring 2 is introduced into the flanged end of one of the pipes 3, 4 and the flanged end of the other pipe is then slipped onto the other lip 15. The lips 15 then center (if necessary) the pipes 3, 4 so that the axis of one of the pipes at least substantially coincides with the axis of the other pipe. The next step involves the application of the (still expanded) clamping device 7 and split cylinder 6 over the flanges 5 so that the flanges are located radially inwardly of the web 7a and the external surface or outer side of each flange is adjacent one of the sidewalls 8. Once it surrounds the flanges 5, the diameter of the clamping device 7 can be reduced to such an extent that the annular edges 11 of the conical radially inner portions 9 of the sidewalls 8 abut but do not as yet penetrate well into the respective external surfaces 3a, 4a.

The diameter of the clamping device 7 is thereupon forcibly reduced in any suitable way, e.g., in a manner as shown in FIG. 3 of U.S. Pat. No. 3,346,275 to Des Jardins, whereby the web 7a moves nearer to the peripheral surfaces of the flanges 5 and the sidewalls 8 of the axially rigid clamping device 7 move their radially outer portions 13 against the adjacent portions of external surfaces of the flanges 5 with a force F (FIG. 3) which is applied to a relatively large portion of the external surface of each flange. As the diameter of the clamping device 7 decreases, the toothed edges 11 of the radially inner portions 9 of the sidewalls 8 are caused to penetrate into the material of the respective pipes. Additional reduction of the diameter of the clamping device 7 results in flexing of the radially inner sections 14 of the radially outer portions 10 of the sidewalls 8 (compare FIGS. 1 and 3) because the edges 11 have penetrated into the respective pipes and prevent axial movements of the radially inner portions 9 away from each other, i.e., away from the respective flanges 5. This results in a pronounced reduction of each base angle d, and each of these angles is ultimately reduced to zero or close to zero so that the radially outer sections 13 of the sidewalls 8 lie flush or practically flush against the adjacent radially outermost portions of the external surfaces of the respective flanges 5. In other words, each of the two forces F is distributed over a relatively large portion of the external surface of the adjacent flange 5 (this is shown in FIG. 3 by two arrays of parallel arrows). The resultant of forces acting between a radially outer section 13 and the adjacent flange 5 is remote from the peripheral surface of such flange, and this is desirable and advantageous because the flanges 5 apply substantially uniform deforming forces to relatively large portions of the radially extending washer-like portion 2a of the sealing ring 2.

Another important advantage of relatively large-area contact between the radially outer sections 13 of the sidewalls 8 and the adjacent flanges 5 is that the flanges are subjected to less pronounced bending stresses, namely to stresses which would tend to impart to the flanges a frustoconical shape and would be likely to develop if the sidewalls 8 were to bear only against the radially outermost portions of the external surfaces of the flanges 5 in response to a reduction of the diameter of the clamping device 7. Since the flanges 5 are free to remain in radial planes, they are less likely to permit the development of clearances between their internal surfaces and the adjacent surfaces of the washer-like portion 2a of the sealing ring 2 to thus greatly reduce the likelihood of leakage of confined fluid medium, even if such medium is maintained at an elevated pressure.

The edges 11 of the conical radially inner portions 9 of the sidewalls 8 also reduce the likelihood of leakage of fluid radially outwardly between the flanges 5 and thence into the interior of the clamping device 7 because the edges 11 penetrate into the exernal surfaces 3a, 4a and thus prevent axial movements of the pipes 3, 4 away from each other.

FIG. 3 shows that the diameter of the clamping device 7 can be reduced to an extent such that the base angles c between the internal surfaces 21a of the second sections 21 and the adjacent portions of external surfaces of the flanges 5 are reducef to zero or nearly to zero. This even further increases the area of contact between the sidewalls 8 and the adjacent flanges 5 with attendant additional reduction of the likelihood of leakage of confined hydraulic or pneumatic fluid, even at very high pressures of such fluid. The resultants of forces acting upon the external surfaces of the flanges 5 migrate toward the common axis of the pipes 3, 4 as the diameter of the clamping device 7 decreases, i.e., as the area of contact between the sidewalls 8 and the respective flanges 5 increases. This, in turn, even further reduces the tendency of flanges 5 to assume a conical shape and to permit penetration of pressurized fluid between their internal surfaces and the adjacent sides or surfaces of the washer-like portion 2a of the sealing ring 2.

As the flanges 5 are caused to move toward each other, the radially extending portion 2a of the sealing ring 2 undergoes axial deformation and tends to expend radially outwardly toward the web 7a of the clamping device 7. The extent of radial expansion of the washer-like radially extending portion 2a is controlled by the annulus 18 in the groove 19. As mentioned above, the material of the sealing ring 2 can completely surround and shield the annulus 18 when the pipe coupling 1 is in actual use; this is desirable and advantageous because the preferably metallic annulus 18 is less likely to be corroded as a result of contact with an aggressive fluid.

The fluid which is confined in the pipes 3 and 4 bears against the internal surface of the sealing ring 2 and thereby presses the lips 15 against the adjacent portions of internal surfaces of the respective pipes. This even further enhances the sealing action because the stressed lips prevent the confined fluid from penetrating into contact with the concave external surfaces 16 of the lips 15 and with the adjacent convex internal surfaces of radially inner portions 17 of the flanges 5. The sealing action of the lips 15 becomes more satisfactory in response to rising pressure of fluid which is confined in the pipes 3 and 4. The feature that the radii of curvature of the concave external surfaces 16 of the sealing lips 15 are preferably larger than the radii of curvature of the internal surfaces 17a and larger than the radii of curvature $r_i$ is desirable and advantageous because this ensures that the lips 15 bear against the adjacent radially inner parts or portions 17 even if the flanges 5 exhibit a certain tendency to move their radially outermost portions axially toward each other, i.e., even if the flanges exhibit a certain tendency to assume a frustoconical shape.

Some relatively small displacement of the radially outer portions of the flanges 5 toward each other in response to a reduction of the diameter of the clamping device 3 actually assists in the establishment of an even more satisfactory sealing action. Thus, as the conicity of the illustrated radially extending flanges 5 increases from zero to a relatively small value, the area of contact between the external surfaces of the thus deformed flanges and the internal surfaces 21a of sections 13 of the radially outer portions 10 of the sidewalls 8 increases accordingly so that the loci of the resultants of forces F are moved further toward the common axis of the pipes 3, 4. This even further reduces the likelihood of penetration of confined fluid along the sides of the ring portion 2a and all the way to the web 7a.

The sealing action of the lips 15 even further reduces the likelihood of penetration of fluid between the inner sides of the flanges 5 and the adjacent sides of the radially extending ring portion 2a. Thus, and even if the flanges 5 are caused to assume a slightly conical shape, the concave external surfaces 16 bear against the adjacent internal surfaces 17a with a force which increases in response to rising fluid pressure in the pipes 3 and 4 so that the fluid is prevented from flowing along the concave surfaces 16 and radially outwardly along the flanges 5 toward the web 7a. Consequently, even if a gap develops between each of the conically deformed flanges 5 and the adjacent side of the ring portion 2a, such gaps cannot be filled with fluid because the sealing action between the lips 15 and the adjacent portions of the pipes and their flanges is highly reliable and improves with rising pressure in the pipes. As mentioned above, the radii of curvature of the concave surfaces 16 can exceed the radii of curvature of the convex surfaces 17a. This ensures the establishment of reliable sealing engagement between the surfaces 16 and 17a even if the radii of curvature of the surfaces 17a increase as a result of flexing of the radially outermost parts of the flanges 5 toward each other.

The annulus 18 can be made of commercially available metallic or plastic wire. All that is necessary is to sever a piece of requisite length from a longer piece of wire and to bond the ends of the shorter piece to each other. This obviates the need for the establishment of discrete supplies of annuli having different diameters.

The improved coupling can be modified in a number of ways without departing from the spirit of the invention. For example, the pipes can be provided with at least slightly conical flanges (which diverge in directions toward the axes of the pipes) if the illustrated sealing ring 2 having a flat washer-like radially extending portion 2a is replaced with a sealing ring having a radially extending portion with a substantially trapezoidal cross-sectional outline. The conicity (angle d) of the radially outer sections 13 of the radially outer portions 10 of the sidewalls 8 then approximates or slightly exceeds the conicity of the adjacent conical external surfaces of the flanges. The basic mode of operation of the thus modified coupling for pipes having conical flanges would remain unchanged.

The metallic annulus 18 can be replaced with an annulus made of a suitable plastic material which is harder (less elastic) than the material of the radially extending portion 2a of the sealing ring 2. The metallic or plastic annulus 18 can be installed in the recess 19 and embedded into the sealing ring 2 in the course of the vulcanizing operation, i.e., during making of the sealing ring. It is further within the purview of the invention to replace a metallic or plastic annulus 18 which is installed in a recess of the sealing ring portion 2a with a ring which resembles a shell having a U-shaped or semicircular cross-sectional outline and surrounds the peripheral surface and the adjacent radially outermost portions of the side surfaces of the washer like portion 2a. Still further, the annulus 18 can be replaced with a short cylindrical member which surrounds only the peripheral surface of the washer-like portion 2a between the flanges 5 Such annulus can be vulcanized to the portion 2a.

The depth of the recess 20 in the internal surface of the sealing ring 2 can be increased if it is desired to enhance the flexibility of the lips 15 relative to the radial portion 2a and to thus enable the lips to even more closely adhere to the adjacent portions of the respective pipes and flanges. A relatively deep recess 20 is desirable and advantageous when the anticipated pressure of the fluid which flows in the pipes 3 and 4 is relatively low.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A coupling for pipes having external surfaces and confronting ends provided with outwardly extending flanges, comprising a deformable elastomeric sealing ring insertable between the flanges; a variable-diameter annular clamping device positionable to surround the flanges and including two axially spaced-apart sidewalls each outwardly adjacent one of the flanges when said device surrounds the flanges, said sidewalls diverging from one another toward the external surfaces of the pipes and including radially outer portions and radially inner portions comprising conical internal surfaces having edges arranged to engage the external surfaces of the pipes, said radially outer portions urging the flanges against the sealing ring and said edges bearing against the external surfaces of the pipes in response to a reduction of a diameter of said clamping device while said device surrounds the flanges; and means for varying the diameter of said clamping device.

2. The coupling of claim 1, wherein said edges are toothed edges and extend circumferentially around and penetrate into the external surfaces of the pipes in response to said reduction of the diameter of said clamping device.

3. The coupling of claim 1, wherein said conical internal surfaces have apex angles of 10°–30°.

4. The coupling of claim 3, wherein said apex angles at least approximate 15°.

5. The coupling of claim 1 for pipes having confronting ends provided with at least substantially radially outwardly extending flanges, wherein said radially outer portions include radially outer sections with conical internal surfaces having a base angle of 1°–4° and second sections disposed between the respective radially outer sections and the respective radially inner portions and having conical internal surfaces with a base angle greater than the base angles of internal surfaces of said radially outer sections.

6. The coupling of claim 5, wherein the base angle of the internal surface of each of said radially outer sections at least approximates 2°.

7. The coupling of claim 5 for pipes having flanges with outer sides including concave radially inner parts having first radii of curvature and merging into the respective external surfaces, said radially outer portions further having radially inner sections disposed between the respective second sections and the respective radially inner portions and having convex internal surfaces with radii of curvature greater than said first radii of curvature.

8. The coupling of claim 1, wherein said sealing ring includes a radially extending portion between the flanges and two lips each extending into one of the pipes radially inwardly of the respective flange.

9. The coupling of claim 8 for pipes having flanges with radially inner portions having convex internal surfaces with first radii of curvature, wherein said lips have concave external surfaces with second radii of curvature, the concave external surfaces of said lips being adjacent the respective convex internal surfaces.

10. The coupling of claim 9, wherein said second radii of curvature at least approximate said first radii of curvature in undeformed condition of said sealing ring.

11. The coupling of claim 9, wherein said first radii of curvature are slightly smaller than said second radii of curvature in undeformed condition of said sealing ring.

12. The coupling of claim 1, wherein said sealing ring has a radially outermost part and further comprising an at least substantially rigid circumferentially complete annulus engaging said radially outermost part.

13. The coupling of claim 12, wherein said radially outermost part of said sealing ring has a peripheral surface with a groove for said annulus.

14. The coupling of claim 13, wherein said groove is undercut to at least substantially confine said annulus when the flanges are urged against said sealing ring in response to a reduction of the diameter of said clamping device.

15. The coupling of claim 12, wherein said annulus consists of metallic wire.

16. The coupling of claim 1, wherein said sealing ring has an internal surface and an annular recess in said internal surface.

17. The coupling of claim 16, wherein said sealing ring comprises two annular lips flanking said recess and each extending into one of the pipes when said sealing ring is located between the flanges.

18. The coupling of claim 1, wherein said radially outer portions and the respective inner portions make obtuse angles.

19. A coupling for pipes having external surfaces and confronting ends provided with outwardly extending flanges, comprising a deformable elastomeric sealing ring insertable between the flanges and having a radially outermost part; an at least substantially rigid circumferentially complete annulus engaging said radially outermost part, said radially outermost part having a peripheral surface with a groove for said annulus; a variable-diameter annular clamping device positionable to surround the flanges and including two axially spaced-apart side walls each outwardly adjacent one of said flanges when said device surrounds the flanges, said sidewalls diverging from one another toward the external surfaces of the pipes and including radially outer portions and conical radially inner portions, said radially outer portions urging the flanges against the sealing ring and said radially inner portions bearing against the external surfaces of the pipes in response to a reduction of the diameter of said clamping device while said device surrounds the flanges; and means for varying the diameter of said clamping device.

20. The coupling of claim 19, wherein said groove is undercut to at least substantially confine said annulus when the flanges are urged against said sealing ring in response to a reduction of the diameter of said clamping device.

21. A coupling for pipes having external surfaces and confronting ends provided with outwardly extending flanges, comprising a deformable elastomeric sealing ring insertable between the flanges and having a radially outermost part; an at least substantially rigid circumferentially complete annulus consisting of metallic wire and engaging said radially outermost part; a variable-diameter annular clamping device positionable to surround the flanges and including two axially spaced-apart sidewalls each outwardly adjacent one of said flanges when said device surrounds the flanges, said sidewalls diverging from one another toward the external surfaces of the pipes and including radially outer portions and conical radially inner portions, said radially outer portions urging the flanges against the sealing ring and said radially inner portions bearing against the external surfaces of the pipes in response to a reduction of the diameter of said clamping device while said device surrounds the flanges; and means for varying the diameter of said clamping device.

* * * * *